US008355709B2

(12) United States Patent
Nagaraj (10) Patent No.: US 8,355,709 B2
(45) Date of Patent: Jan. 15, 2013

(54) DEVICE THAT DETERMINES WHETHER TO LAUNCH AN APPLICATION LOCALLY OR REMOTELY AS A WEBAPP

(75) Inventor: Nagendra Nagaraj, Bangalore Karnatak (IN)

(73) Assignee: QUALCOMM Incorporated, San Diego, CA (US)

( * ) Notice: Subject to any disclaimer, the term of this patent is extended or adjusted under 35 U.S.C. 154(b) by 1285 days.

(21) Appl. No.: 11/739,991

(22) Filed: Apr. 25, 2007

(65) Prior Publication Data

US 2008/0268828 A1 Oct. 30, 2008

Related U.S. Application Data

(60) Provisional application No. 60/862,535, filed on Oct. 23, 2006.

(51) Int. Cl.
*H04M 3/00* (2006.01)
(52) U.S. Cl. ........................................ 455/419; 455/566
(58) Field of Classification Search .................. 709/318; 455/556, 566, 419
See application file for complete search history.

(56) References Cited

U.S. PATENT DOCUMENTS

| | | | |
|---|---|---|---|
| 6,141,759 A | 10/2000 | Braddy | |
| 6,990,662 B2 | 1/2006 | Messer | |
| 7,331,048 B2 | 2/2008 | Skovira | |
| 2001/0020255 A1* | 9/2001 | Hofmann et al. | 709/318 |
| 2003/0013483 A1* | 1/2003 | Ausems et al. | 455/556 |
| 2005/0060704 A1 | 3/2005 | Bulson et al. | |
| 2005/0240765 A1 | 10/2005 | Genty et al. | |
| 2005/0240777 A1 | 10/2005 | Keohane et al. | |
| 2006/0005181 A1 | 1/2006 | Fellenstein et al. | |
| 2006/0047802 A1 | 3/2006 | Iszlai et al. | |
| 2006/0059492 A1 | 3/2006 | Fellenstein et al. | |
| 2006/0064442 A1 | 3/2006 | Nemoto | |
| 2006/0069621 A1 | 3/2006 | Chang et al. | |
| 2006/0106689 A1 | 5/2006 | Greenstein et al. | |
| 2006/0155633 A1 | 7/2006 | Fellenstein et al. | |
| 2007/0155204 A1* | 7/2007 | Klitsner et al. | 439/131 |
| 2008/0026746 A1* | 1/2008 | Appaji | 455/426.1 |
| 2010/0023582 A1* | 1/2010 | Pedersen et al. | 709/203 |

FOREIGN PATENT DOCUMENTS

| | | |
|---|---|---|
| JP | 2005141669 A | 6/2005 |
| JP | 2006502457 A | 1/2006 |

OTHER PUBLICATIONS

International Search Report—PCT/US08/061640—International Search Authority—European Patent Office—Oct. 7, 2008.
Written Opinion—PCT/US08/061640—International Search Authority—European Patent Office—Oct. 7, 2008.

* cited by examiner

*Primary Examiner* — Phuoc Doan
(74) *Attorney, Agent, or Firm* — Eric Ho (57) ABSTRACT

A utility program executing on a mobile communication device decides whether to launch an application remotely as a Webapp or whether to launch the application locally on the mobile communication device. The decision is based at least in part on an estimate of how much of a resource the application would consume were the application to be launched and executed on the mobile communication device. Examples of resources include battery capacity, memory capacity, and processing power capacity. If the total amount of a resource consumed by currently executing applications and the application to be launched would exceed a threshold amount, then the utility uses a browser on the mobile communication device to launch the application remotely as a Webapp, otherwise the utility program causes the application to be launched locally. The utility program has a graphical user interface (GUI) whereby utility program operation can be configured and customized.

29 Claims, 4 Drawing Sheets

DEVICE THAT DETERMINES WHETHER TO LAUNCH AN APPLICATION LOCALLY OR REMOTELY AS A WEBAPP

Claim of Priority under 35 U.S.C. §119

The present Application for Patent claims priority to Provisional Application No. 60/862,535, entitled. "COMPUTE POWER, AS SERVICE FROM SERVICE PROVIDER" filed on Oct. 23, 2006, and assigned to the assignee hereof and hereby expressly incorporated by reference herein.

BACKGROUND INFORMATION

1. Technical Field

The disclosed embodiments relate to web applications.

2. Background Information

Cellular telephones execute ever more complex application programs. Examples of complex application programs include video messaging programs, mobile television viewing programs, and three-dimensional multi-user video game programs. A contemporary user of a cellular telephone often does not just use the cellular telephone to engage in wireless telephone conversations. Rather, the user uses the cellular telephone as an input/output device to interact with and access services and data provided by and on other remote computers. In one example, the cellular telephone of each of a plurality of users executes a copy of a video game application program. The cellular telephones communicate with each other either directly or through a central computer such that the users can all play the same multi-user video game in a common virtual environment.

Executing such a complex application program on a cellular telephone may, however, consume a large proportion of the resources of the cellular telephone. Examples of cellular telephone resources include battery capacity, memory capacity, and processing power. Executing the complex application program may take up a lot of the available battery capacity. Playing the video game may, in fact, use so much battery energy that there is inadequate battery energy left over for the cellular telephone to communicate as a cellular telephone. Alternatively, playing the video game may consume battery energy quickly without the user recognizing that the resulting discharged battery is so discharged that it cannot power the cellular telephone for a cellular telephone call of ordinary duration.

Not only can a complex application use a large amount of the available battery energy, but the complex application program may also use a large proportion of the available random access memory (RAM) of the cellular telephone. If the cellular telephone is being used to the play the multi-user video game, then so much of the available memory may be used by the video game application that the cellular telephone may not be able to invoke another application program at the same time. Executing the complex application program may also require and use a large proportion of the available processing power of the central processing unit (CPU) of the cellular telephone. If the cellular telephone is being used to the play the multi-user video game, then so much of the processing power of the cellular telephone may be used that it may not be possible to execute another application program with a desired processing speed or responsiveness.

Some of these problems can be addressed by executing the complex application program on a remote computer and using the cellular telephone as an input/output device to interact with an application. Browser software executing on the cellular telephone that is used to interact with the remote computer uses a smaller amount of resources than the complex application program would were the complex application program executed on the cellular telephone. The usage of resources in the cellular telephone is therefore reduced. The application program that executes on the remote computer is sometimes called a "web-browser application", a "web application" or a "Webapp" because the browser executing on the cellular telephone is used to communicate across the World Wide Web with the application running on the remote computer. Internet access to such applications executing on a cluster of computers (sometimes referred to as a "server farm") may be provided for a fee for use by cellular telephone users as Webapps. In one example, the multi-user video game application program is executing on a computer in such a server farm. Rather than consuming large amounts of cellular telephone resources executing the complex application program on the cellular telephone, the user only executes the browser on the cellular telephone and interacts with the complex application program that is executing on the computer in the server farm.

It is not, however, always desirable to execute such a complex application program on a remote computer. There may be cost issues, or communication latency or reliability issues, or other issues that favor execution of the complex application on the cellular telephone in a particular circumstance. Where the resources of the cellular telephone are stretched thin due to usage of such application programs, there may be only a small amount of spare resources available on the cellular telephone. If, for example, a higher priority application is then to be used, it may not be possible to invoke the higher priority application program if the total amount of resource usage would exceed the total available amount of resources on the cellular telephone. The situation could also involve a resource being used so heavily that when an incoming cellular telephone call is to be received, the cellular telephone does not have adequate resources to receive the call. Managing the resources and deciding which application programs to offload as Webapps and which application programs not to offload or not invoke in a given circumstance can be cumbersome and difficult.

SUMMARY

A utility program executing on a mobile communication device (for example, a cellular telephone) decides whether to launch a first instance of an application program locally on the mobile communication device or to launch a second instance of the application program remotely as a web application (hereinafter "Webapp"). The decision is based at least in part on an estimate of how much of a resource the first instance would consume were it to be launched and executed on the mobile communication device. Examples of resources include battery capacity or battery energy usage, memory capacity or memory usage, and processing power capacity or usage. In one example, if the total amount of a particular resource consumed by executing currently executing applications and the first instance of the application program would exceed a threshold amount, then the utility program uses a browser program on the mobile communication device to launch the second instance of the application program remotely as a Webapp, otherwise the utility program causes the first instance of the application program to be launched locally. The utility program interacts with the operating system of the mobile communication device to cause the decided upon type of launching. Examples of the application program include a multi-user electronic game, a video game, a video editing program, a video messaging program, and a computationally-intensive financial analysis program.

In some embodiments, the first and second instances are identical programs. In one embodiment, the first instance is a simplified version of the application that is customized and adapted for execution on a device having limited resources. The second instance, on the other hand, is appropriate for execution on the remote computer that does not have the resource constraints of a mobile communication device.

The utility program has a graphical user interface (GUI) whereby a user of the mobile communication device can configure and customize utility program operation. The GUI is, for example, usable to change the conditions under which the decision is made to launch an application remotely as a Webapp. The user can use the GUI to disable offloading of a particular application.

In a specific example, the GUI causes a resource usage table to be displayed on the display of the mobile communication device in response to an appropriate prompt by the user. The table lists all the application programs that are executing on the mobile communication device. In addition, the table lists the application program that is to be launched. For each application program listed, the table includes a usage value for each type of resource. In the case of the application program to be launched, the usage values are estimated usage values. The estimated usage values are usages that would occur were a first instance of the application program to be executed locally on the mobile communication device. Based at least in part on the resource usage values of the currently executing application programs and the estimated resource usage values of the application program to be launched, the utility program determines whether the application program to be launched should be executed on the mobile communication device or should not be executed on the mobile communication device. If the determination is that the application program should not be executed on the mobile communication device, then the utility program uses the browser program on the mobile communication device to launch a second instance of the application program remotely as a Webapp. In this scenario, the second instance of the application program is not split such that some of the application program is executing on the mobile communication device and such that another part of the application program is executing remotely. No part of the second instance of the application program is executing on the mobile communication device. If, however, the determination is that the application program should be executed on the mobile communication device, then the utility causes the first instance of the application program to be launched locally on the mobile communication device. The first instance of the application program is not split between the mobile communication device and the remote computer. No part of the first instance of the application program is executing on the remote computer.

In some embodiments, the utility program can terminate execution of the second instance of the application program on the remote computer under some resource usage conditions. The first instance of the application program is launched on the mobile communication device in the state that the second instance was in when it was terminated. Execution of the application program therefore migrates back from the remote computer under the control the utility program.

The foregoing is a summary and thus contains, by necessity, simplifications, generalizations and omissions of detail; consequently, those skilled in the art will appreciate that the summary is illustrative only and does not purport to be limiting. Other aspects, inventive features, and advantages of the devices and/or processes described herein, as defined solely by the claims, will become apparent in the non-limiting detailed description set forth herein.

DETAILED DESCRIPTION

Figure 1:
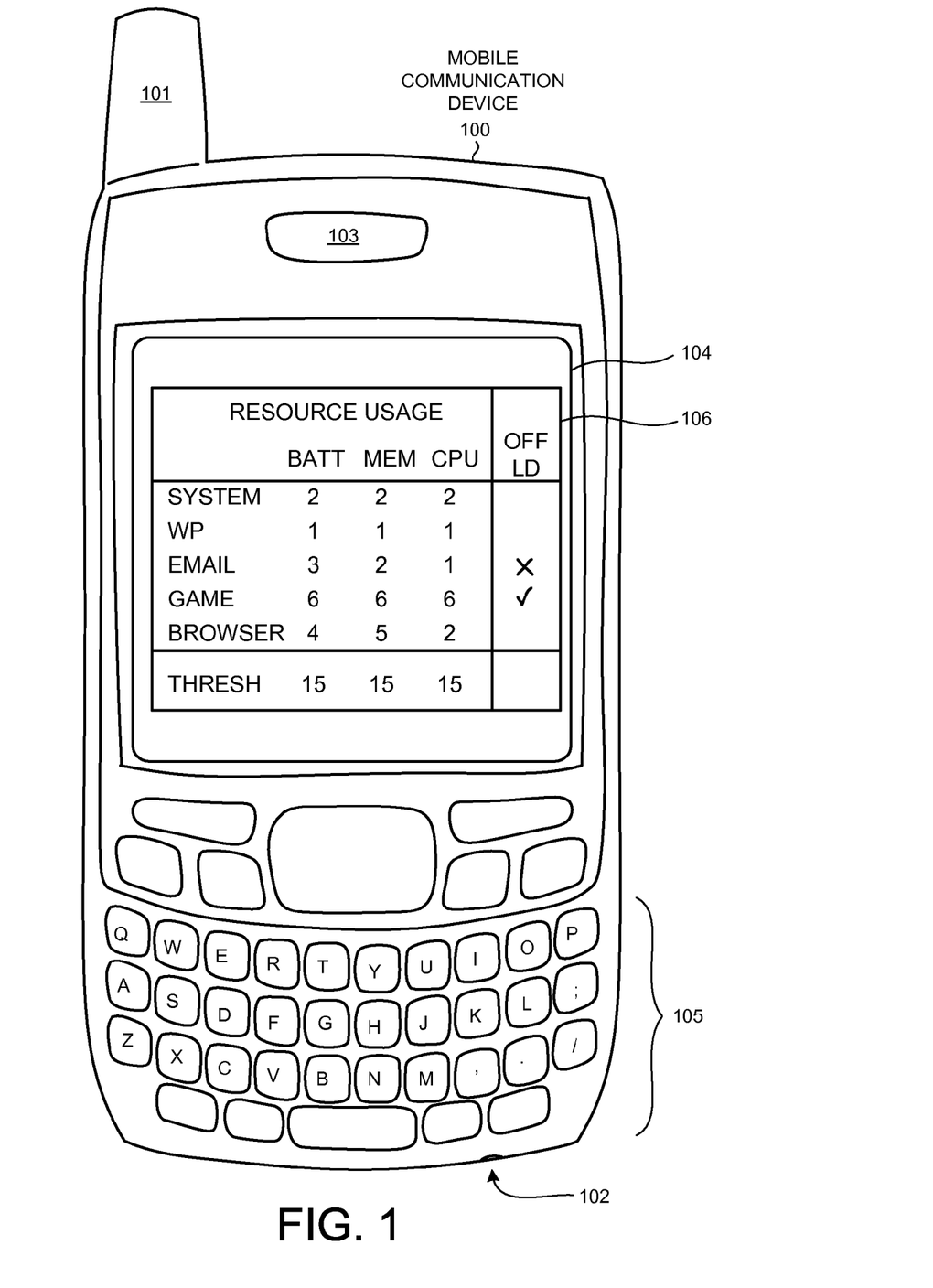
FIG. 1 is a view of the front of a mobile communication device that executes a novel utility program in accordance with one novel aspect.

FIG. 1 is a view of the front of a mobile communication device 100 in accordance with one novel aspect. Mobile communication device 100 in this example is a cellular telephone that has an antenna 101, a built-in microphone 102, a speaker 103, a display 104 and a QWERTY keypad 105. The electronics within mobile communication device 100 includes, among other parts, RF transceiver circuitry, a digital baseband processor integrated circuit, a rechargeable battery or batteries, and a power management integrated circuit. This circuitry is not illustrated in FIG. 1 because FIG. 1 is a plan view and the circuitry is contained within the housing of mobile communication device 100. The baseband processor integrated circuit includes an amount of semiconductor memory, and a digital processor. The semiconductor memory is a processor-readable medium that stores programs of processor-executable instructions that are executable on the processor. The processor accesses the memory and executes an operating system program of processor-executable instructions out the memory. The processor is also able to execute application layer programs. In the example of FIG. 1, there are multiple such application layer programs executing on the processor including: a word processing program designated "WP", an email and calendar and contact manager program designated "EMAIL", a three-dimensional multi-user video game designated "GAME", a web browser program designated "BROWSER", and a novel utility program. Execution of the utility program provides a graphical user interface (GUI) whereby a user of mobile communication device 100 can view output of the utility program and can interact with and configure the utility program. In one operational mode of the utility program, the GUI causes a resource usage table 106 to be displayed on display 104.

Resource usage table 106 includes in the left-most column a list of various programs that are executing on the cellular telephone. The "SYSTEM" entry refers to the operating system and the novel utility application program. Although the utility program is an application layer program, it is tightly coupled to the operating system and is therefore listed as part of the operating system. For each of the listed programs, resource usage table 106 includes a numerical value that is indicative of an amount of a resource that is being used or is otherwise allocated to or reserved by the program. In the example of FIG. 1, there are three different resources listed:

battery power usage (listed on the display as "BATT"), memory usage (listed as "MEM"), and processing power usage (listed as "CPU"). The email program designated "EMAIL", for example, is indicated to be using three units of the power usage resource "BATT", two units of the memory usage resource "MEM", and one unit of the processing power resource "CPU". The bottom row of the resource usage table 106 sets forth a threshold value for each of the three resources. The units of the usage values and threshold values in resource usage table 106 are normalized with respect to each other. In one example, the threshold values are fixed values that cannot be changed by the user. In another example, the GUI allows a user of mobile communication device 100 manually to change the threshold values within predetermined ranges.

The right-most column of resource usage table 106 includes an indication of whether each of the programs has been offloaded to execute as a Webapp on a remote computer. In the example of FIG. 1, the video game application "GAME" is executing on a remote computer and the browser of cellular telephone 100 and the cellular telephone hardware itself are being used to interact with the remotely executing game program on the remote computer. The fact that the application program "GAME" has been offloaded is designated by the check mark in the right-most column. The GUI allows the user manually to disable offloading of a selected one of the listed programs. In the example of FIG. 1, the user has disabled offloading of the email program designated "EMAIL". The "offload disabled" state is indicated in resource usable table 106 by the cross is the right-most column.

In ordinary operation of mobile communication device 100, the utility program does not cause resource usage table 106 to be displayed. Rather, resource usage table 106 is displayed in response to appropriate user prompts to the utility program. In this way, the user can enter a prompt using the GUI thereby causing table 106 to appear, can then interact with the utility using the GUI and the table, and can then enter an appropriate prompt that causes table 106 to be displayed no longer. The utility program, however, continues to execute in the background even though table 106 is not being displayed.

Figure 2:
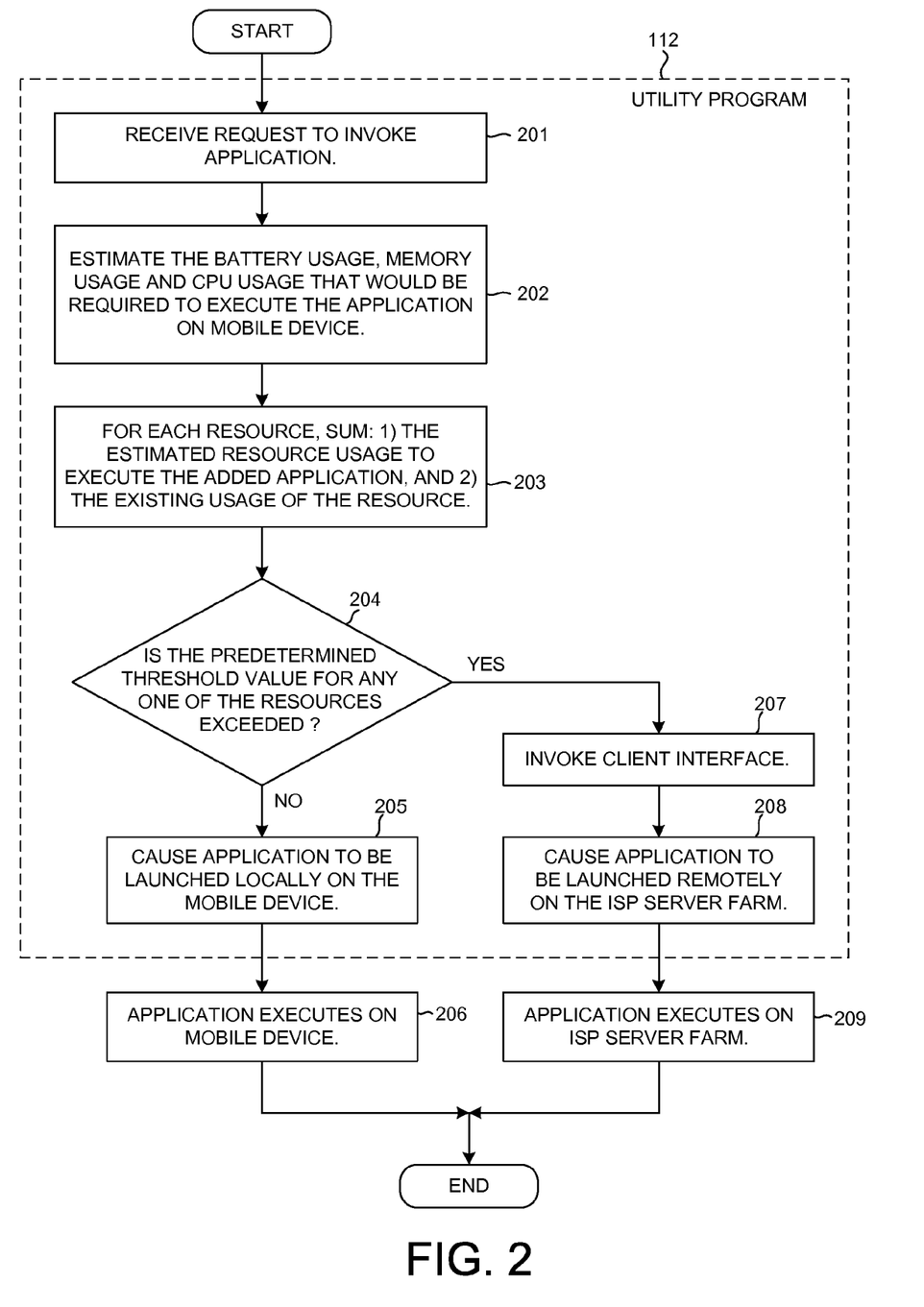
FIG. 2 is a simplified flowchart that illustrates an operation of the novel utility program.

FIG. 2 is a simplified flowchart that illustrates a method in accordance with one novel aspect. The method is carried out using mobile communication device 100 of FIG. 1. Initially, the processor is executing the operating system program and the novel utility application program as well as a few other application programs. Each program consumes an amount of each of the three resources "BATT", "MEM" and "CPU". In the initial state before step 201, the "WP", "EMAIL" and "BROWSER" applications listed in FIG. 1 are executing. The "GAME" application is, however, not executing. The display 104 therefore appears as it appears in FIG. 1, except that the row having the "GAME" entry is not present. Note that the total power usage (resource "BATT") is ten usage units. The total memory usage (resource "MEM") is also ten usage units. The total processing power usage (resource "CPU") is six usage units. All three usage totals are therefore below their respective threshold values.

The user then takes an action to invoke the multi-user video game application program designated "GAME". The user may, for example, select an icon of the video game GAME that appears on display 104. The operating system detects this condition and issues a request to the utility program to invoke the GAME application. The utility program receives the request to invoke (step 201).

Next (step 202), the utility program estimates the amount of each resource that would be consumed by the application layer program if the application layer program were to be executed. In one example, the processing power that would be consumed by the new application program is determined by historical empirical data. If, for example, every time the GAME program was executed previously six usage units of CPU processing power were consumed on average, then this average usage value of six is stored and used as the estimated CPU usage value. The amount of processing power actually being used by the other programs that are already executing can be determined in any one of many suitable ways. For example, the utility program or the operating system may periodically interrupt the CPU to check CPU activity. In a crude example, a low priority task is periodically issued to the CPU and data is collected as to whether the operating system allowed the task to be executed. The operating system may output CPU usage data that is usable by the utility program. This data may be collected and output in the way that the task manager of a conventional Windows operating system collects and outputs CPU usage data.

The estimated amount of power consumption (resource "BATT") may similarly be determined by historical empirical data. The power management integrated circuit (PMIC) within the cellular telephone may monitor battery voltage at discrete times. Changes in the voltage measured indicate the amount of energy consumption. By analyzing battery voltage when selected individual application programs are being executed, or when selected subgroups of individual application programs are being executed, information on the battery energy consumption of each individual application program is collected.

The estimated amount of memory usage (resource "MEM") may similarly be determined by historical empirical data. The amount of memory allocated to each application layer program is generally known to the operating system. These usage values are supplied to the utility program. If every time the GAME application program was executed it consumed six usage units, then the estimate is that this next time the GAME program is executed it will likely consume six usage units as well. The actual memory usages of the various application programs executing are output by the operating system and are used by the utility program as set forth above. Accordingly, at this point in the method of FIG. 2 all the usage values set forth in resource usage table 106 of FIG. 1 are known to the utility program.

Next (step 203), for each resource, the estimated usage of the application program to be invoked is summed with the resource usage values of the other programs that are executing. In the present example, the sum for the "BATT" resource is sixteen units. The sum for the "MEM" resource is also sixteen units. The sum for the processing power resource "CPU" is twelve units.

Next (step 204), a decision is made as to whether the application program to be launched should be launched and executed on the mobile communication device or should be launched and executed on a remote computer. This decision is based at least in part on: 1) the estimated resource usage values for the application to be launched, and 2) the amount of resources consumed by the other programs currently executing on the mobile communication device 100. In the example of the utility program of FIG. 2, if the sum of any of the three resources as determined in step 203 exceeds a corresponding predetermined threshold value for that resource, then it is determined that the application program to be launched should not be executed on the mobile communication device 100, but rather an instance of the application program should be executed on a remote computer as a Webapp.

If the sum as determined in step 203 for each of the three resources were below its corresponding threshold value, then processing would proceed to step 205. The utility program would communicate with the operating system and would cause the application program (the GAME program in this case) to be launched on the mobile communication device. Thereafter (step 206), the application program would execute in normal fashion on mobile communication device 100.

In the present example, however, the sum for the "BAT" resource is sixteen and the corresponding threshold value for the "BATT" resource is fifteen. Also, the sum for the "MEM" resource is sixteen and the corresponding threshold values for the "MEM" resource is fifteen. The decision of step 204 is therefore not to launch the GAME application program on the mobile communication device, but rather to invoke a client interface (step 207). The client interface is interface software that is integrated into the web browser program of the mobile communication device. When the client interface is integrated into the browser in this fashion, the browser is usable to communicate with a corresponding host interface on a remote computer. The client interface captures user inputs such as keypad key press information and communicates them across the internet to the host interface. The host interface in turn supplies the user input to the application program executing on the remote computer so that to the application program executing on the remote computer it appears that the user input were generated locally in normal fashion. Data output from the application program such as display data passes in the opposite direction through the host interface, across the internet, and to the browser and client interface. The browser displays the display data on display 104 of mobile communication device 100 in a similar way to the way that the display data would ordinarily have been displayed on a display local to the remote computer. This client interface and the associated host interface software is conventional Webapp software. An example of this interface software is available from Citrix Systems Inc. of Fort Lauderdale, Fla.

Once the client interface has been invoked (step 207), then the utility program acts through the client interface and host interface and causes the GAME application program to be launched (step 208) on the remote computer. Thereafter, the GAME application program executes on the remote computer (step 209). At no time did the GAME application program ever execute on the mobile communication device 100. The GAME application program was not split such that some of the application executed on the mobile communication device and another part of the GAME application program was executed on the remote server. A instance of the GAME application program is executed on the remote computer as a Webapp with the browser on the mobile communication device and the mobile communication device hardware being used to interact with the Webapp. In this instance, the instances of the application program that execute on the mobile communication device and on the remote computer differ in that the instance that is on the mobile communication device executes on a different processor and has reduced functionality so that it can execute with adequate speed on the mobile communication device that has limited resources as compared to the remote computer.

Figure 3:
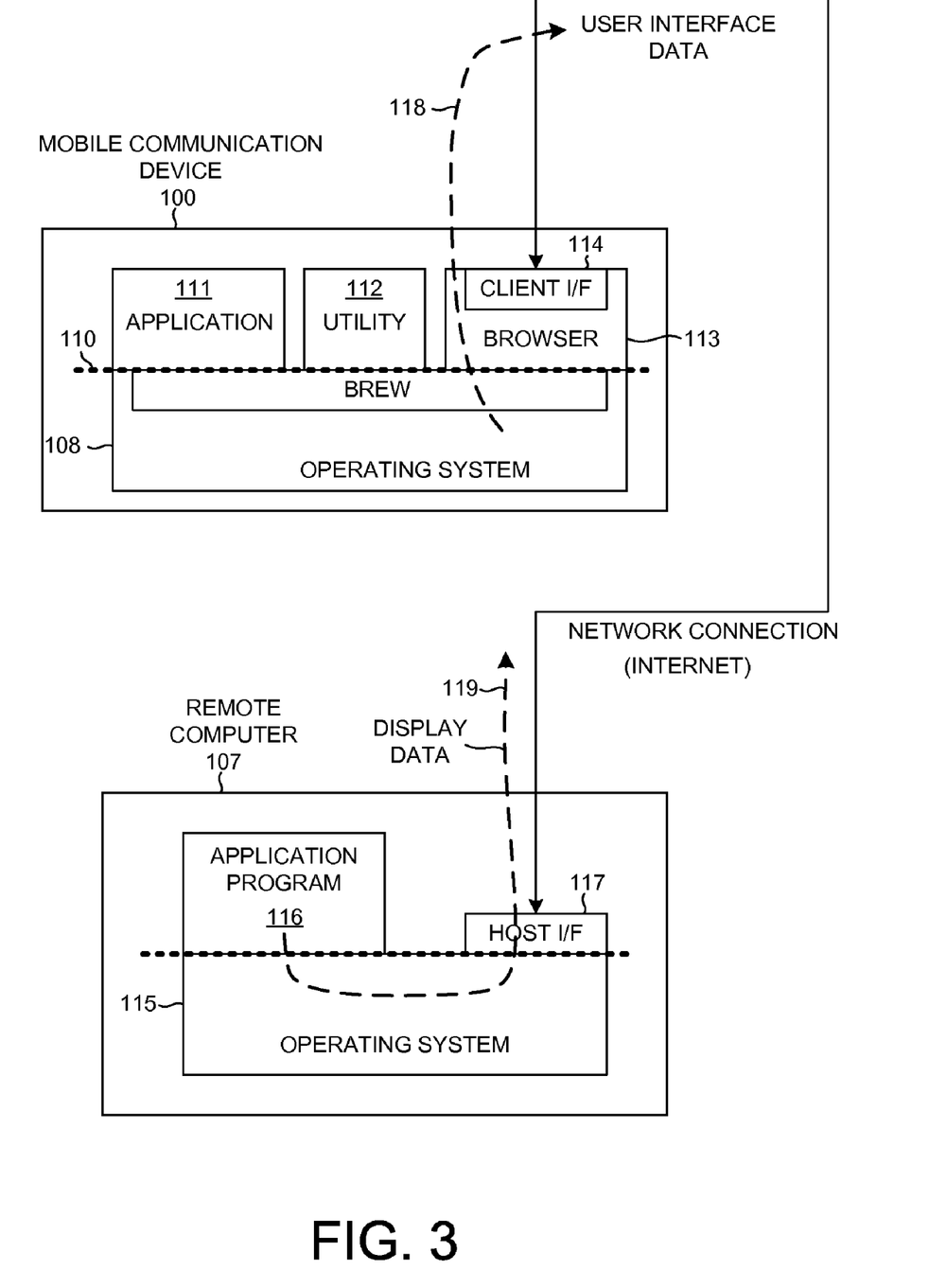
FIG. 3 is a diagram that illustrates the software executing in the mobile communication device of FIG. 1 and on a remote computer.

FIG. 3 is a diagram that illustrates the software executing in mobile communication device 100 and remote computer 107. The software executing on mobile communication device 100 includes the operating system 108 having a BREW (Binary Runtime Environment for Wireless) type application programming interface 109. The horizontal dashed line 110 represents the interface between the operating system 108 and application layer programs 111-113 that execute on the operating system. Application program 111 is the first instance of the application program that is to be launched. Application program 112 is the novel utility program. Utility program 112 is illustrated here as an application layer program because it provides the GUI and outputs display data and receives user inputs. The utility program 112 may, however, also be considered to be a part of the operating system 108. Application program 113 is the web browser into which the client interface functionality 114 is incorporated.

Software executing on the remote computer 107 includes an operating system 115, the second instance 116 of the application program to be launched, and host interface functionality 117. Remote computer 107 is a computer that is a part of a server farm of computer resources. The second instance 116 of the application program is usable as a Webapp by a user of mobile communication device 100. Dashed arrow 118 represents information flow from mobile communication device 100 to the remote computer 107. This information flow involves user entry data and input information such as key press information on which keys of keypad 105 the user pressed. This information passes from mobile communication device 100, across a wireless link (for example, a CDMA wireless link), and through other networks and the internet, to the server farm and remote computer 107. Dashed arrow 119 represents information flow from remote computer 107 to mobile communication device 100. This information flow involves display data that is output by the second instance 116 of the application program that is executing on remote computer 119. Rather than this display data being displayed on a monitor or screen or other display of remote computer 107, the display data is communicated across the internet and the wireless link to mobile communication device 100. The browser 113 on mobile communication device 100 renders the information such that it is displayed on display 104 of mobile communication device 100.

Figure 4:
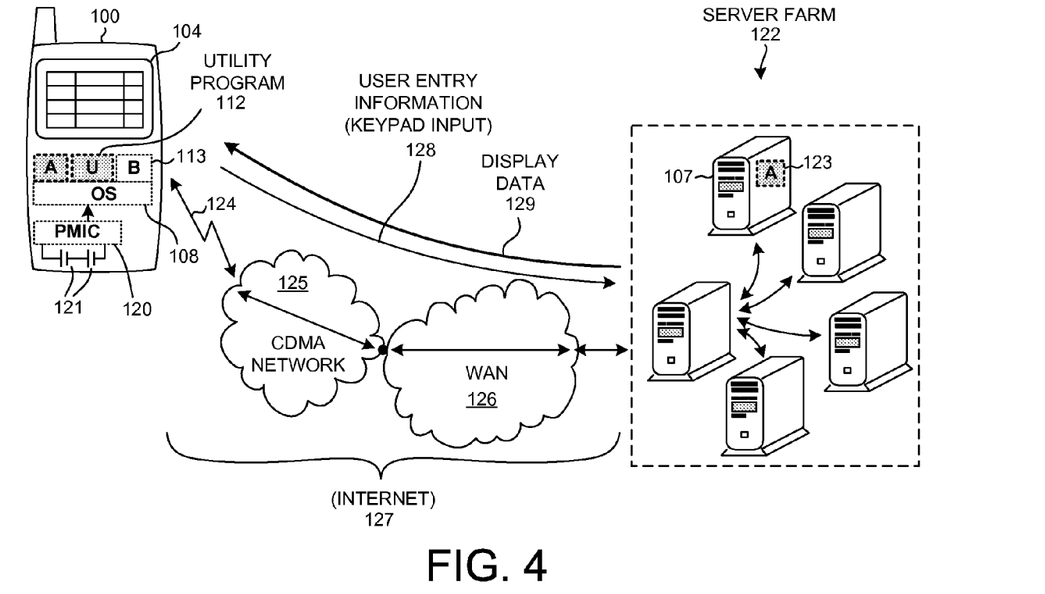
FIG. 4 is an illustration of the mobile communication device of FIG. 3, the remote computer of FIG. 3, and the communication path between the two.

FIG. 4 is an illustration of mobile communication device 100, remote computer 107, and the communication between the two. The blocks in mobile communication device 100 labeled "A", "U", "B" and "OS" designate the first instance of the application program to be launched, the utility program, the browser having the client interface, and the operating system, respectively. These programs are stored in semiconductor memory and are executed by the processor of mobile communication device 100 as explained above. The block 120 labeled "PMIC" is a power management integrated circuit. Power management integrated circuit 120 is coupled to rechargeable batteries 121. Power management integrated circuit 120 monitors battery voltage and provides battery information to the processor. The battery information may be battery voltage in some embodiments. The battery information may in other embodiments be an indication of the amount of energy stored in the battery or the rate of battery power consumption or current consumption.

Remote computer 107 is one of several computers in server farm 122. The block 123 labeled "A" within remote computer 107 designates the second instance of the application program to be launched. This second instance of the application program is the program that can be executed remotely on remote computer 107 as a Webapp.

Communication between mobile communication device 100 and remote computer 107 passes through a wireless link 124, a cellular telephone network 125 (in this case, a CDMA network), and a wide area network (WAN) 126. WAN 126, CDMA network 125 and the wireless link 124 can all be considered to be a part of the internet 127. Arrow 128 represents user entry information passing from mobile communication device 110 to the Webapp executing on remote computer 107. Arrow 129 represents display data that is output by the Webapp executing on remote computer 107 and that passes from remote computer 107 to mobile communication device 110.

Figure 5:
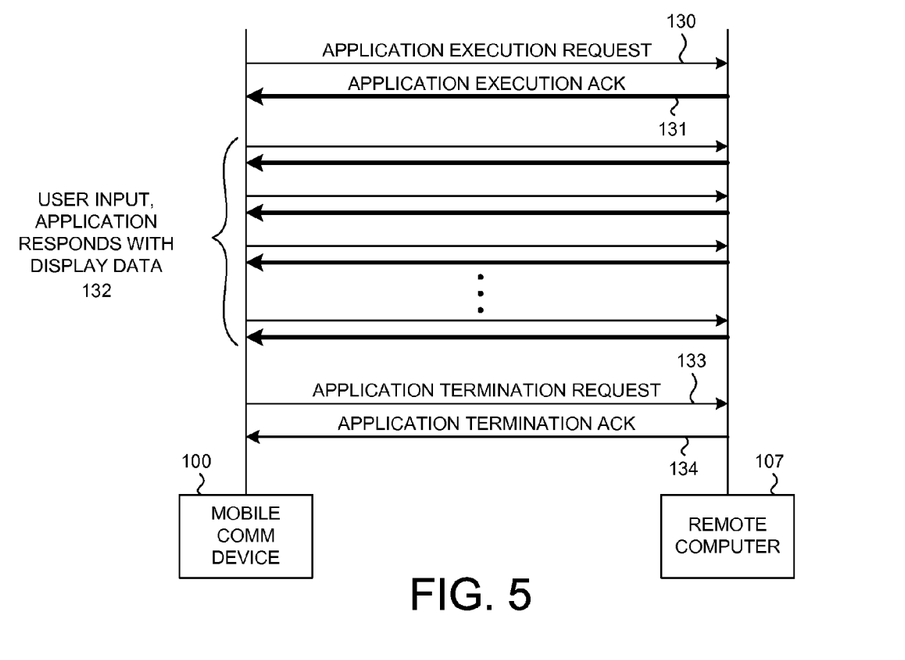
FIG. 5 illustrates a sequence of communications that occurs between the mobile communication device of FIG. 4 and the remote computer of FIG. 4.

FIG. 5 illustrates a sequence of communications that occurs between mobile communication device 100 and remote computer 107 in one scenario. Time in the illustration extends from top to bottom. The upper arrow 130 represents an application execution request. This is the communication that causes the second instance of the application program to be launched on the remote computer. In some examples, the application execution request includes the telephone number of the mobile communication device 100. The next arrow 131 represents an acknowledge communication whereby remote computer 107 acknowledges that the second instance of the application program has been launched. Arrow 131 being illustrated as a relatively darker and heavier arrow is to indicate that the communication from remote computer 107 to mobile communication device 110 is a relatively high-bandwidth communication involving more information transfer than the information flow in the opposite direction from mobile communication device 100 to remote computer 107. The following pairs of arrows 132 represent application streaming. User input is communicated to the Webapp executing on remote computer 107, which in turn results in new display data that is output from the Webapp and is communicated back to mobile communication device 100 for display. The last pair of arrows 133 and 134 represents the utility program in mobile communication device 100 terminating the Webapp execution on remote computer 107. In one example, in addition to terminating execution and sending the acknowledgment 134, the remote computer 107 sends additional status information on the state of execution of the Webapp to mobile communication device 100. This status information is then useable on mobile communication device 100 to resume execution of the application at the state of the application when the application was terminated. From the user's perspective, the application continues to execute as if the location of execution of the application program never changed. The GUI is usable to change the conditions under which the utility program will terminate Webapp execution.

In one embodiment, an application execution request includes the telephone number of a requesting mobile communication device. The operator of the server farm maintains information on the telephone numbers of mobile communication device users and also maintains associated billing information on the users. When an application execution request is received at the server farm, the telephone number in the incoming request is used to identify associated billing information and to bill the user of the mobile communication device for use of the provided Webapp application program. Alternatively, identification information other than a telephone number is embedded in the application execution request and this other identification information is used to facilitate the operator's billing of the user for use of the Webapp application program.

In some embodiments, there is a second application program executing on the remote computer. This second application program causes the host interface to include advertising information into the communication back to the client interface along with the Webapp display data. The client interface and browser executing on the mobile communication device receives the communication and causes the advertisement to be rendered on the display of the mobile communication device along with the Webapp display data. In another example, the second application program causes advertising information to be loaded and stored into the mobile communication device when there is communication between the remote computer and the mobile communication device. When the first instance of the application program is invoked locally on the mobile communication device, then the stored advertising information is automatically displayed along with the display data of the application program. This display occurs even if at the time of invocation there is no communication between the mobile communication device and the remote computer at the server farm.

Although certain specific embodiments are described above for instructional purposes, the teachings of this patent document have general applicability and are not limited to the specific embodiments described above. Examples of a mobile communication device include: a cellular telephone, a personal digital assistant (PDA), a laptop computer, a tablet personal computer, a smart phone, or any mobile device that executes a web browser. Accordingly, various modifications, adaptations, and combinations of the various features of the described specific embodiments can be practiced without departing from the scope of the claims that are set forth below.

What is claimed is:

1. A method comprising:
   on a mobile communication device making a decision of whether to launch a first instance of an application program locally on the mobile communication device or whether to launch a second instance of the application program remotely as a web application, wherein the decision is based at least in part on an estimate of how much of a resource of the mobile communication device the first instance of the application program would consume were the first instance of the application to be launched and executed on the mobile communication device.

2. The method of claim 1, wherein the mobile communication device is a cellular telephone that executes a browser program, where the browser program is used to render display data received from the web application.

3. The method of claim 1, wherein the resource is taken from the group consisting of: battery capacity, memory capacity, processing power capacity, battery usage, memory usage, and processing power usage.

4. The method of claim 1, wherein the decision to launch the second instance results in a launch of the second instance of the application program on a remote computer.

5. The method of claim 1, wherein the application program is taken from the group consisting of: a multi-user electronic game, a video game, a video editing program, a video messaging program, and a computationally-intensive financial analysis program.

6. A method comprising:
   (a) on a mobile communication device making a decision of whether to launch a first instance of an application program locally on the mobile communication device or whether to launch a second instance of the application program remotely as a web application, wherein the decision is based at least in part on an estimate of how much of a resource of the mobile communication device the first instance of the application program would consume were the first instance of the application to be launched and executed on the mobile communication device; and
   (b) displaying a list of application programs on a display of the mobile communication device, wherein the application programs in the list include application programs that are executing on the mobile communication device, and wherein the application programs in the list include application programs that are being executed remotely as web applications, wherein a utility program executing on the mobile communication device determines the application programs in the list and also makes the decision in (a).

7. The method of claim 6, further comprising:
(c) displaying an associated list of resource amount values on the display of the mobile communication device, wherein each resource amount value in the list of resource amount values is associated with a respective one of the application programs in the list of application programs.

8. The method of claim 7, wherein the decision of (a) involves determining if a sum of each resource amount value and the estimate of how much of the resource the first instance of the application program would consume exceeds a predetermined threshold value.

9. The method of claim 8, wherein if the sum is determined to exceed the predetermined threshold value then the decision in (a) is that the application program should not be executed on the mobile communication device.

10. The method of claim 6, wherein the utility program has a graphical user interface (GUI).

11. The method of claim 10, wherein the GUI is usable to specify that the decision in (a) will be that the application program should be executed on the mobile communication device regardless of how much of the resource the first instance of the application program would consume.

12. A mobile communication device comprising:
a memory that stores a first instance of an application program and a utility program; and
a processor that executes the utility program, wherein execution of the utility program determines whether the first instance of the application program will be launched locally on the mobile communication device or whether a second instance of the application program will be launched remotely as a web application on a remote computer, wherein the determination is made based at least in part on an amount of a resource of the mobile communication device that the application program would consume were the application program to be launched and executed on the mobile communication device.

13. The mobile communication device of claim 12, further comprising:
a display that displays a list of application programs executing on the processor, wherein the list also includes a resource amount value for each of the application programs listed in the list, wherein execution of the utility program by the processor causes the list to be displayed on the display.

14. The mobile communication device of claim 12, wherein the determination involves determining whether a threshold usage value for the resource would be exceeded if the first instance of the application program were to be launched and executed on the mobile communication device.

15. The mobile communication device of claim 12, wherein no part of the second instance of the application program is executed on the mobile communication device if the second instance of the application program is launched remotely as a web application.

16. The mobile communication device of claim 12, wherein the mobile communication device is a cellular telephone that executes a web browser, and wherein the web browser is used to render display data received from the web application.

17. The mobile communication device of claim 12, further comprising:
a display that displays a list of application programs, wherein the list includes both application programs that are executing on the mobile communication device as well as application programs that are being executed remotely as web applications, wherein the utility program being executed by the processor determines the application programs in the list.

18. The mobile communication device of claim 17, wherein the display displays an associated list of resource amount values, and wherein each resource amount value in the list of resource amount values is associated with a respective one of the application programs in the list of application programs.

19. The mobile communication device of claim 12, wherein the utility program has a graphical user interface (GUI).

20. The mobile communication device of claim 12, wherein the resource is taken from the group consisting of: battery capacity, memory capacity, processing power capacity, battery usage, memory usage, and processing power usage.

21. The mobile communication device of claim 12, wherein the application program is taken from the group consisting of: a multi-user electronic game, a video game, a video editing program, a video messaging program, and a computationally-intensive financial analysis program.

22. A mobile communication device comprising:
a memory that stores a first instance of an application program and a utility program;
a processor that executes the utility program, wherein execution of the utility program determines whether the first instance of the application program will be launched locally on the mobile communication device or whether a second instance of the application program will be launched remotely as a web application on a remote computer, wherein the determination is made based at least in part on an amount of a resource of the mobile communication device that the application program would consume were the application program to be launched and executed on the mobile communication device, and wherein the determination involves determining whether a threshold usage value for the resource would be exceeded if the first instance of the application program were to be launched and executed on the mobile communication device;
a battery; and
a power management integrated circuit coupled to the battery, wherein the power management integrated circuit provides battery information to the processor, and wherein the processor uses the battery information in determining whether the threshold usage value would be exceeded.

23. A mobile communication device comprising:
means for storing a first instance of an application program; and
means for determining whether the first instance of the application program is to be launched locally on the mobile communication device or whether a second instance of the application program is to be launched remotely as a web application on a remote computer, wherein the determining is based on:
an amount of a resource of the mobile communication device that the first instance of the application program would consume when launched and executed on the mobile communication device, and whether a threshold usage value for the resource would be exceeded when the first instance of the application program is launched and executed on the mobile communication device.

24. The mobile communication device of claim 23, further comprising:
means for displaying a list of application programs executing on the mobile communication device, wherein the means for displaying is usable to change conditions under which the means for determining determines that the application program is to be launched remotely as a web application.

25. The mobile communication device of claim 23, further comprising means for terminating execution of the web application on the remote computer.

26. The mobile communication device of claim 23, wherein the means for storing is random access memory (RAM) accessed by a processor on the mobile communication device.

27. A set of processor-executable instructions stored on a processor-readable medium, wherein the set of processor-executable instructions is for performing the steps of:
(a) maintaining information indicative of an amount of a resource of a mobile communication device that a local instance of an application program would use if the local instance were executed on the mobile communication device; and
(b) determining whether the local instance should be launched locally on a mobile communication device or whether a remote instance of the application program should be launched remotely so that it is usable from the mobile communication device as a web application, wherein the determination is based at least in part on the information maintained in (a), and wherein the processor-readable medium is a part of the mobile communication device.

28. A mobile communication device comprising:
a memory that stores a first instance of an application program and a utility program;
a processor that executes the utility program, wherein execution of the utility program determines whether the first instance of the application program will be launched locally on the mobile communication device or whether a second instance of the application program will be launched remotely as a web application on a remote computer, wherein the determination is made based at least in part on an amount of a resource of the mobile communication device that the application program would consume were the application program to be launched and executed on the mobile communication device; and
a display that displays a list of application programs, wherein the list includes both application programs that are executing on the mobile communication device as well as application programs that are being executed remotely as web applications, wherein the utility program being executed by the processor determines the application programs in the list, wherein the display displays an associated list of resource amount values, and wherein each resource amount value in the list of resource amount values is associated with a respective one of the application programs in the list of application programs, and wherein execution of the utility program determines whether a predetermined threshold value would be exceeded by a sum of each resource amount value plus the amount of the resource that the application program would consume were the first instance of the application program to be launched locally on the mobile communication device.

29. The mobile communication device of claim 28, wherein execution of the utility program determines that the first instance of the application program should not be launched locally on the mobile communication device if the sum is determined to exceed the predetermined threshold value.

\* \* \* \* \*